United States Patent
Sigg et al.

(10) Patent No.: US 9,924,447 B1
(45) Date of Patent: Mar. 20, 2018

(54) DISTINGUISHING BETWEEN FOREGROUND AND BACKGROUND COMMUNICATIONS BASED ON ANALYSIS OF CONTEXT INFORMATION

(71) Applicant: Sprint Spectrum L.P., Overland Park, KS (US)

(72) Inventors: Jason P. Sigg, Overland Park, KS (US); Jared A. Bohndorf, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/437,169

(22) Filed: Feb. 20, 2017

(51) Int. Cl.
*H04W 48/08* (2009.01)
*H04M 1/725* (2006.01)
*H04W 36/32* (2009.01)

(52) U.S. Cl.
CPC ....... *H04W 48/08* (2013.01); *H04M 1/72597* (2013.01); *H04W 36/32* (2013.01)

(58) Field of Classification Search
CPC .. H04W 48/08; H04W 36/32; H04M 1/72597
See application file for complete search history.

(56) References Cited

U.S. PATENT DOCUMENTS

| 7,275,089 B1* | 9/2007 | Marshall | G01W 1/00 702/2 |
|---|---|---|---|
| 7,756,946 B1 | 7/2010 | Roka et al. | |
| 8,041,777 B2 | 10/2011 | Roka et al. | |
| 8,095,642 B1 | 1/2012 | Martin et al. | |
| 8,560,002 B1 | 10/2013 | Narendran et al. | |
| 8,577,732 B1 | 11/2013 | Martin et al. | |
| 8,832,792 B2 | 9/2014 | Mikan | |
| 2008/0132269 A1* | 6/2008 | Shen | H04L 47/762 455/550.1 |
| 2010/0017521 A1* | 1/2010 | Ying | H04L 65/80 709/227 |
| 2012/0140743 A1* | 6/2012 | Pelletier | H04W 72/0453 370/335 |
| 2013/0115990 A1* | 5/2013 | Koc | G06F 9/485 455/509 |
| 2013/0223335 A1* | 8/2013 | Kwag | H04W 48/18 370/328 |

(Continued)

FOREIGN PATENT DOCUMENTS

WO  WO2016061566  4/2016

*Primary Examiner* — Mehmood B Khan

(57) ABSTRACT

A method is disclosed for determining whether a communication or communication session requested by or directed to a user equipment device (UE) is a foreground or background communication, based on context information derived about the communication and in the absence of any direct indication from the UE. If it is determined that the communication is foreground, then no action is taken to limit the communication. If it is determined that the communication is foreground, then an action is taken to limit allocation of at least one network resource need for the communication. As a further aspect, the procedure for context-based determination is then initiated contingent upon the determination that the UE is roaming in a wireless network of a service provider different from a home service provider.

19 Claims, 7 Drawing Sheets

(56) References Cited

U.S. PATENT DOCUMENTS

| | | | |
|---|---|---|---|
| 2013/0242730 A1* | 9/2013 | Pelletier | H04W 28/0284 370/230 |
| 2013/0301541 A1* | 11/2013 | Mukherjee | H04W 74/0833 370/329 |
| 2014/0098778 A1* | 4/2014 | Valentin | H04W 4/001 370/329 |
| 2014/0106770 A1* | 4/2014 | Valentin | H04W 4/001 455/452.1 |
| 2014/0307659 A1* | 10/2014 | Kweon | H04W 76/064 370/329 |
| 2014/0362778 A1* | 12/2014 | Belghoul | H04W 76/046 370/329 |
| 2015/0031365 A1* | 1/2015 | Tajima | H04W 36/24 455/436 |
| 2015/0172955 A1 | 6/2015 | Meekel et al. | |
| 2015/0195716 A1* | 7/2015 | Worrall | H04W 76/068 455/452.1 |
| 2015/0230152 A1 | 8/2015 | Raleigh et al. | |
| 2016/0309379 A1* | 10/2016 | Pelletier | H04W 76/022 |
| 2017/0094570 A1* | 3/2017 | Kim | H04W 36/08 |
| 2017/0135135 A1* | 5/2017 | Pelletier | H04W 74/0833 |
| 2017/0251516 A1* | 8/2017 | Bangolae | H04W 76/046 |

\* cited by examiner

DISTINGUISHING BETWEEN FOREGROUND AND BACKGROUND COMMUNICATIONS BASED ON ANALYSIS OF CONTEXT INFORMATION

BACKGROUND

Unless otherwise indicated herein, the materials described in this section are not prior art to the claims and are not admitted to be prior art by inclusion in this section.

Cellular wireless networks typically include a number of base stations that radiate to define wireless coverage areas, such as cells and/or cell sectors, in which user equipment devices (UEs) (also referred to as wireless communication devices (WCDs)) such as cell phones, "smart" phones, tablet computers, tracking devices, embedded wireless modules, and other wirelessly equipped communication devices, can operate. Each base station is coupled to network infrastructure that provides connectivity with one or more transport networks, such as the public switched telephone network (PSTN) for voice communications and/or the Internet for voice and/or data communications for instance.

In general, a wireless network operates in accordance with a particular air interface protocol or radio access technology, with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1×RTT and 1×EV-DO), and Global System for Mobile Communications (GSM), among others. Each protocol defines its own procedures for registration of UEs, initiation of communications, allocation of bandwidth for UE communications, handoff/handover between coverage areas, and functions related to air interface communication.

In practice, a base station may be configured to provide service to UEs on multiple carrier frequencies or "carriers." Each carrier could be a time division duplex (TDD) carrier that defines a single frequency channel multiplexed over time between downlink and uplink use, or a frequency division duplex (FDD) carrier that defines two separate frequency channels, one for downlink communication and one for uplink communication. Each frequency channel of a carrier may then occupy a particular frequency bandwidth (e.g., 1.4 MHz, 3 MHz, 5 MHz, 10 MHz, or 20 MHz) defining a range of frequency at a particular position (e.g., defined by a center frequency) in a radio frequency band (e.g., in the 800 MHz band, the 1.9 GHz band, or the 2.5 GHz band).

With this arrangement, a UE within the coverage area of the wireless network may engage in air interface communication with a base station. This arrangement enables UEs to communicate via the base station with various remote network entities or with other UEs served by the base station or by one or more other base stations.

In a number of markets, cellular wireless service is available from more than one service provider or "carrier," each service provider deploying and operating its own wireless communication network, for example. Owing to unequal coverage of respective wireless communication networks of two or more different service providers, or other possible factors affecting relative coverage, a subscriber in one service provider's network may, from time to time, gain access to and receive service from the wireless communication network of a different service provider. When this occurs, the subscriber is said to be "roaming" in the different service provider's network. Customarily, the subscriber's network is referred to as the "home" network, and the "roamed-to" network is referred to as the "roaming network," "visited network," or "foreign network." Service providers may typically establish "service level agreements" ("SLAs") between each other to accommodate roaming of their respective subscribers in each other's networks. SLAs may specify how costs of providing un-subscribed service to each other's respective subscribers are identified, recovered, and resolved.

OVERVIEW

Communications from a base station to a mobile communication device (or just mobile device), such as a UE, are carried on a "forward link" (e.g., in a CDMA system) or "downlink" (e.g., in a UMTS/LTE network) of an air interface between the UE and base station, and communications from a UE to the base station are carried on "reverse link" (e.g., in a CDMA system) or "uplink" (e.g., in a UMTS/LTE network) of the air interface. Transmitting data in the downlink direction can be generally referred to as "downloading," while transmitting data in the uplink direction can be generally referred to as "uploading."

Downlink and uplink communications between a UE and a base station can be further distinguished as "background communications" or "foreground communications." In the downlink direction, "background downloading" is a process by which the UE downloads data or some form of content without user input at the time. For example, the UE may be programmed to automatically download content at particular times, and the UE may do so without prompting the user for approval and without receiving a user request or approval at the time to do so. As another example, the UE may receive a content-notification message indicating that content is available to be downloaded, and the UE may responsively download the content without prompting the user for approval and without receiving a user request or approval at the time to do so. (When the UE conducts a background download, the user may or may not perceive the device conducting the background download. For instance, the UE may or may not present a notice when it is conducting the background download).

On the other hand, "foreground downloading" is a process by which the UE downloads the content in response to user request or approval at the time, or as part of communication or transaction in which the user is actively involved. For example, a user may be engaged in a voice or video call. As another example, the user may invoke a browser or other application on the UE and thereby direct the UE to download particular content at the time, and the device may responsively do so. As still a further example, the UE may receive a content-notification message indicating that content is available to be downloaded, the UE may responsively prompt the user for approval and receive user approval. In response to the user approval, the device may then download the content, as another instance of foreground downloading.

Similar descriptions and/or distinctions apply to "background uploading" and "foreground uploading."

In general, foreground communications may be considered those which involve some aspect of direct user involvement, whether simply responding to a prompt to engage in the communication or being actively involved in a real-time application such as a voice or video call or other transmission involving media data. In contrast, background communications may be considered those which may occur without user involvement or even user knowledge. One aspect of distinction between background and foreground communications may therefore also relate to a relative importance to user experience, user expectation regarding service, or degree of criticality of an application or UE function. More particularly, it may be acceptable or desirable to delay or prevent background communications at times or under conditions when network resources required to support such communications are overloaded, unavailable, or deemed too expensive to allocate. At the same time, it may not be acceptable or desirable to apply any such restrictions or limitations to foreground communications under the same or similar network circumstances.

Non-limiting examples of circumstances that could warrant consideration of whether background communications should be subject to delay (or be prevented), while refraining from limiting or impeding foreground communications, include times when network resources are overloaded, if/when it is determined that a user has consumed more than some threshold amount of data services, or if/when a user's subscribing service provider determines that the user is roaming in the wireless network of another, different service provider. Because many communications can be between a UE and a service or server that is external to a service provider's network, it may not be possible for an entity in the service provider's network, such as a base station or packet gateway or the like, to directly determine or be aware of which communications are foreground and which are background. Thus, even if network circumstances or other conditions warrant limiting a particular background communication in some way, a network configured for conventional operating procedures may not be able to directly identify the particular communication as being background to begin with. It would therefore be desirable for a wireless communication network to be capable of distinguishing background communications from foreground communications in the absence of an otherwise direct differentiating indicator, such as information provided by a UE involved in the communication, for example.

Accordingly, example embodiments herein provide for systems and methods for distinguishing between foreground and background communications based on analysis of context information about the communications, as derived from a network entity that has at least some involvement in supporting the communications. For example, the network entity could be in a bearer path and/or a signaling path of the communications, or could be involved in setting up the communications. Among circumstances, such as the non-limiting ones mentioned above, that could warrant delaying or limiting background communications, roaming may be of interest to a service provider, because roaming costs paid by a home network to a foreign network according a SLA, for example, can exceed the fees collected from the home network's subscribers for various types of services, including roaming in the foreign network. Accordingly, it would be desirable to evaluate delaying or limiting background communications of a UE when it is roaming in a foreign network—i.e., that of a service provider different from its subscribing service provider.

Hence, in one respect, various embodiments of the present invention provide, in a network entity of a wireless communication network of a first service provider, a method comprising: at the network entity, receiving a data communication indicative of a request to establish a communication session with a user equipment device (UE) that is accessing the wireless communication network via an air interface; at the network entity, deriving context information about the requested communication session with the UE from the received data communication; based on the derived context information about the requested communication session, making a determination at the network entity of whether the requested communication session is for a foreground communication or a background communication with the UE, the determination being made in an absence of any explicit indication from the UE of whether the requested communication session is for a foreground or background communication; if the determination is that the requested communication session is for a foreground communication with the UE, then taking no action to limit establishment of the requested communication session; and if the determination is that the requested communication session is for a background communication with the UE, then taking an action to limit access to at least one network resource needed to establish the requested communication session.

In another respect, various embodiments of the present invention provide, in a network entity of a wireless communication network of a first service provider, a method comprising: at the network entity, receiving a data communication indicative of a request to establish a communication session with a user equipment device (UE) that is accessing the wireless communication network via an air interface; determining that the UE is roaming in a wireless communication network of a second service provider, different from the first service provider, when the data communication is received; in response to determining that the UE is roaming, taking an action to limit access to at least one network resource needed to establish the requested communication session if the requested communication session is for a background communication with the UE; and in response to determining that the UE is roaming, taking no action to limit establishment of the requested communication session if the requested communication session is for a foreground communication with the UE.

In still another respect, various embodiments of the present invention provide a network entity in a wireless communication network of a first service provider, the network entity comprising: one or more processors; and and memory storing instructions that, when executed by the one or more processors, cause the network entity to carry out operations including: receiving a data communication indicative of a request to establish a communication session with a user equipment device (UE) that is accessing the wireless communication network via an air interface; determining that the UE is roaming in a wireless communication network of a second service provider, different from the first service provider, when the data communication is received; in response to determining that the UE is roaming, taking an action to limit access to at least one network resource needed to establish the requested communication session if the requested communication session is for a background communication with the UE; and in response to determining that the UE is roaming, taking no action to limit establishment of the requested communication session if the requested communication session is for a foreground communication with the UE.

These as well as other aspects, advantages, and alternatives will become apparent to those of ordinary skill in the art by reading the following detailed description, with reference where appropriate to the accompanying drawings. It should be understood, of course, that this summary and other description provided below is set forth for purposes of example only, and that numerous variations are possible, within the scope of the claimed invention.

DETAILED DESCRIPTION

The systems and methods described herein are set forth only as examples. As such, those skilled in the art will appreciate that other arrangements and element (e.g., machines, interfaces, functions, orders, and groupings of functions) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For example, one or more processors executing instructions stored in memory may implement one or more of the features and functions described herein.

Figure 1:
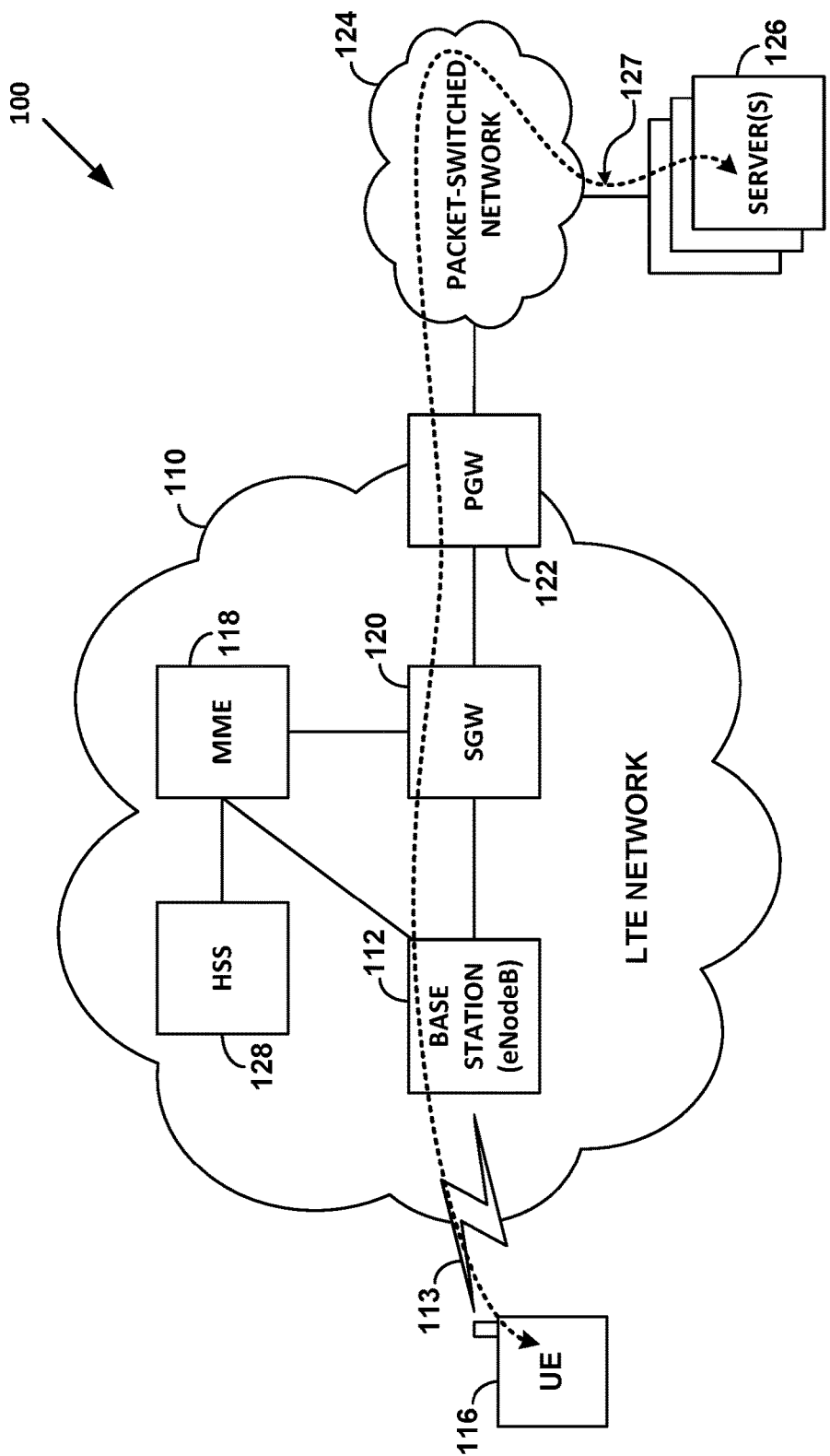
FIG. 1 is a simplified network diagram of an example wireless communications network, according to example embodiments of the disclosed systems and methods.

Referring to the drawings, FIG. 1 is a simplified block diagram of a wireless communication system 100 in which an example of the present method can be implemented. In particular, FIG. 1 includes by way of example a representative LTE radio access network (RAN) 110 including an example LTE base station 112 (also referred to as an eNodeB), which radiates to provide a wireless coverage area defining an LTE air interface 113 through which the base station 112 may serve one or more UEs. The base station 112 is then shown coupled with core LTE network infrastructure, which may include a mobility management entity (MME) 118, a serving gateway (SGW) 120 and a packet-data network gateway (PGW) 122 providing connectivity with a packet-switched network 124 such as the Internet, which may in turn support communications with various services, represented by servers 126, for example. Further, the MME is configured to communicate with a Home Subscriber Server (HSS) 128, which may store account and service profiles for various UEs. Shown within coverage of the base station 112 is then a representative UE 116. In practice, the LTE access network may be operated by a cellular wireless service provider, and the UE may subscribe to service of that provider.

In practice, many of these network components may be owned and/or operated by or for a telecommunications service provider such as a cellular wireless carrier and may physically sit as nodes on a core packet network operated by the service provider. Communications over the various illustrated interfaces may thus pass between various network entities as packet-based communications, such as IP communications for instance, through the core network.

With the example arrangement shown, when the UE 116 enters into coverage of network, the UE may transmit an attach request over the air interface 113 to the base station 112. This attach request may then cause the network to establish for the UE one or more default bearers.

In particular, when the base station 112 receives this initial attach request from the UE, the base station may forward the attach request to the MME 118. The MME may then authenticate and authorize the UE and obtain from HSS 128 an indication of one or more application services to which the UE subscribes and may store an indication of those services in a context record for the UE, keyed to a UE identifier such as an International Mobile Subscriber Identity (IMSI) for instance. For each of various services, the MME may then allocate for the UE a respective bearer ID (e.g., evolved packet system (EPS) bearer ID), which the MME may store in the UE context record in correlation with an identity of the base station for instance. Further, for each such service, the MME then engages in signaling with the SGW 120 and the base station 112 to set up a respective bearer, defining a logical tunnel over which bearer data can flow to and from the UE.

For instance, assuming the UE is authorized for general packet-data service, the MME may engage in signaling with the SGW 120 and the base station 112 to set up for the UE a default bearer to carry general packet-data communication traffic. Further, if the UE is authorized for VoIP service, the MME may also engage in signaling with the SGW and the base station to set up for the UE another default bearer to carry VoIP call setup signaling (e.g., SIP signaling). Each of these bearers may have a corresponding level of service, such a quality of service (QoS) class indicator (QCI) level, as discussed above, which might be keyed to a service level agreement of the UE for instance.

The process of establishing each of these or other bearers may take various forms, the particular details of which are not critical. In a representative implementation, for instance, the MME may transmit to the SGW a create-session request, including in the request one or more parameters (e.g., a QCI value and/or an application service level identifier) indicating the service level and/or other type of bearer to be established and identifying the UE at issue (e.g., by IMSI). The SGW may then responsively send a corresponding create-session request to the PGW 122. Upon receipt of the create-session request, the PGW may then query a policy server for authorization to establish the requested bearer for the UE.

With approval, the PGW may then record an access bearer ID for the UE and may work with the SGW to establish a communication tunnel corresponding with the bearer. In particular, the PGW may transmit to the SGW a create-session response indicating the bearer being established (e.g., providing a bearer ID, CQI, UE identifier, etc.) and informing the SGW of an endpoint identifier (e.g., port and/or address) at the PGW to be used for the bearer. The SGW may then transmit an acknowledgement to the PGW, similarly informing the PGW of an endpoint identifier at the SGW to be used for the bearer. In this manner, the PGW and SGW will establish a tunnel for communicating with each other at their respective endpoint identifiers, and each correlate that tunnel with the bearer at issue, including bearer type parameters such as service level for instance.

The SGW may then transmit to the MME a create-session response that provides any applicable service level parameters for the bearer and that informs the MME of an endpoint identifier at the SGW to be used for communication between the SGW and the base station. The MME may then transmit to the base station an attach-accept message, providing any applicable service level parameters for the bearer and informing the base station of the endpoint identifier at the SGW to be used for communication between the SGW and the base station.

Upon receipt of the attach-accept message from the MME, the base station may then transmit over the air interface 113 to the UE a Radio Resource Control (RRC) Connection Reconfiguration message that specifies a radio-bearer ID and any applicable service level parameters, as well as an attach-accept message. The UE may then store the bearer ID and any applicable parameters and send an RRC Connection Reconfiguration Complete message to the base station, indicating setup of the radio-bearer for air interface communication between the UE and the base station.

Further, the base station may transmit to the MME an attach-complete message, and the MME may transmit to the SGW a corresponding attach-complete message that informs the SGW of an endpoint identifier at the base station to be used for communication between the SGW and the base station. In this manner, the base station and SGW will have established a tunnel for communicating with each other at their respective endpoint identifiers, and each would correlate that tunnel with the bearer at issue, including bearer type parameters such as service level for instance.

Through this or another process, a bearer would thus be established for the UE, including a radio-bearer portion that extends over the air interface between the UE and the base station, and an access-bearer that extends between the base station and the SGW and between the SGW and the PGW. Each of the entities involved in communication over this bearer, including the UE, base station, SGW, and PGW for instance, may also maintain service level parameters for the bearer, so as to facilitate treating communications in an appropriate manner, such as with best-effort service level, guaranteed-bit-rate service level, or another service level for instance.

Beyond establishment of one or more default bearers for the UE, the network may also establish for the UE one or more other bearers. As noted above, for instance, if a VoIP call is to be set up for the UE, the network may establish for the UE a dedicated bearer for use to carry the VoIP traffic to and from the UE with an appropriate service level such as a sufficiently high guaranteed bit rate. For example, if the UE engages in SIP signaling with a call server on transport network 124 to set up a VoIP call, signaling may pass to the PGW to trigger setup of a QCI 1 level bearer for carrying the VoIP bearer traffic. The PGW may then engage in signaling with the SGW, which may in turn engage in signaling with the MME, and the MME may engage in signaling like that described above to control setup of the QCI 1 bearer, including setup of the radio bearer portion and access bearer portion. Further, involved network entities such as the base station may update their context records for the UE to indicate that the UE now has this bearer as well.

With this arrangement, the UE may also engage in communications with one or more network servers, represented by server(s) 126 in FIG. 1, or other entities that provide various services. Non-limiting examples may include media streaming services, application servers, search services, social media sites, content servers, and cloud storage servers, among others. Communications between the UE 116 and the servers 128 (and the services represented) may traverse a communication path 127 that includes the air interface 112, base station 112, SGW 120, PGW 122, and the packet-switched network 124. Other entities not explicitly shown in FIG. 1 may be in the path as well.

When a UE, such as the UE 116, engages in a communication session, the communication may be a foreground communication or a background communication. As described above, a foreground communication may be one that involves active interaction with the user of the UE. For example, a foreground communication may be part of a user application such as a game, video display, or other media program. A background communication, on the other hand, might be one that is carried out without user interaction or possibly even user knowledge. Examples could include download of application program updates, upload of user location information, or download of social media data, to name a few.

When a UE sends a request to establish a communication or communication session, one or more wireless network entities involved in setting it up, such a base station, SGW or PGW, for example, may have direct information indicating whether the communication is foreground or background. Such an indication may be included in the request from the UE, for example. If the communication involves a server that is part of the wireless network, then a direct indication of whether the communication is foreground or background may also be determined, possibly by the network server itself. However, there can be many instances in which the foreground/background nature of a requested communication is not directly available to any entity in the service provider's network For example, an application on a UE may be provided and supported by a third party that is not associated with the service provider, and which operates one or more servers in an external network. The server(s) 126 in FIG. 1 could represent such external, third-party servers. When UE requests as communication session for the application to communicate with these servers, the service provider's wireless network may have no knowledge of the purpose of the communication session. In particular, in the absence of any direct information from the UE when it requests the communication session, the service provider's network does not know if it will be allocating resources for a foreground or background communication. There may be times when limiting or delaying background communications would be desirable. In accordance with example embodiments, a network entity can use context information about a requested communication session to determine whether the communication is foreground or background, and when it is determined be a background communication, the network entity can take an action to limit allocation of at least one resource needed for the requested communication session.

Context information about a communication session can include one or more aspects of, or circumstances surrounding, the communication session. For example, if the UE makes a request for a new communication soon after engaging in a communication known to be a foreground communication, then the new communication may also be a foreground communication. Here, "soon" could be 30 to 60 seconds, for example. Similarly, if the UE makes a request for a new communication soon after engaging in a relatively large number of requests in a short amount of time, then this too could indicate that the new communication may also be a foreground communication. In this case, the high frequency of requests may indicate that the UE is executing an interactive application, such as an online game or the line.

Other indications of foreground/background communications could relate to location or motion of the UE. For example, if location information about the UE—e.g., from GPS—indicate that it is moving at a high speed, then the user might be driving in car. Single or sporadic requests from the UE during this movement might be deemed background communications, as a user is not likely to be engaging in a video game while driving. On the other hand, a high frequency of requests during motion could indicate that the user is no the driver, and might after all be involved in a foreground communication (e.g., the user could be a passenger in a moving car). Location of the UE could be correlated with usage history, such that a request from the UE for a communication from a particular location is deemed likely to be for a foreground or background communication previous communications from this location. A similar analysis could be applied to time of day.

Other examples of context information could relate to the data type carried. As noted above, a communication session carrying media data might be deemed a foreground communication, since media data may typically be associated a media display application, such as video or audio stream to a UE. The volume of data carried may also be an indicator of the type of communication.

In each of these examples (as well as other possible ones), context information about a requested communication can be cast as a characteristic of the communication. As noted above, one or more network entities may be involved in setting up a communication or communication session. Referring again to FIG. 1, network entities that may play a role in setting up a communication can include any one or more of those shown as part the LTE network. In the course of setting up a communication or carrying out a session a network entity may be able to derive one or more characteristics about the communication, for example by inspecting a request message from the UE or taking note of the network resource(s) allocate (or that need to be allocated) for the communication session. The network entity may then compare the derived characteristic with one or more characteristics known to be associated with foreground or background communications. Base on the comparison, the network entity can determine—either definitively or based on a statistical likelihood—whether the requested communication session is for a foreground or background communication. If the requested communication session is determined to be a background communication, the network entity can take action to limit in some way the network resources that are allocated for the communication. Otherwise, the network entity may take no such limiting actions.

Limiting the network resources allocated for a background communication can help preserve resources when doing so is desirable or advantageous. Such resources could include air interface channels, bandwidth allocations, IP addresses, and processing cycles, among others. Actions to limit resources can include withholding authorization for a UE to obtain resources, withholding actual allocation, or placing an upper limit on quantity of resources. Making the determination based on context information allows the network to take appropriate and judicious action even for communications that the network might not otherwise recognize as background. At the same time, allowing foreground communications to proceed unimpeded can help ensure that communications that support interactive applications and other programs and functions that need to run in the foreground are not subject to undesirable or unacceptable limitations.

Among the reasons that it can be advantageous for a network to make a context-based determination of whether a communication request by or for a UE is foreground or background, a service provider may be particularly interested in instances when the UE in question is roaming in the wireless network of different service provider. This is because resources allocated for roaming UE include those of the visited network (i.e., the wireless network of the different service provider). The UE's home service provider must pay compensation to the visited network, for example in accordance with a SLA. These costs can exceed what the subscriber pays the home service provider for similar resources, for example based on a monthly service plan. Thus, the home network may find it beneficial to limit communications with the UE when it is roaming, and being able to identify background communications based on context information provides a way for the home network to do this without necessarily subjecting the subscriber to any inconvenience or noticeable service degradation.

In accordance with example embodiments, then, a network entity may apply context-based determination of the foreground/background nature of communications with a UE to circumstances in which the UE is roaming. In order to describe this approach in more detail, it is useful to first review a few different roaming scenarios. This is discussed below with reference to FIGS. 2, 3, and 4.

Figure 2:
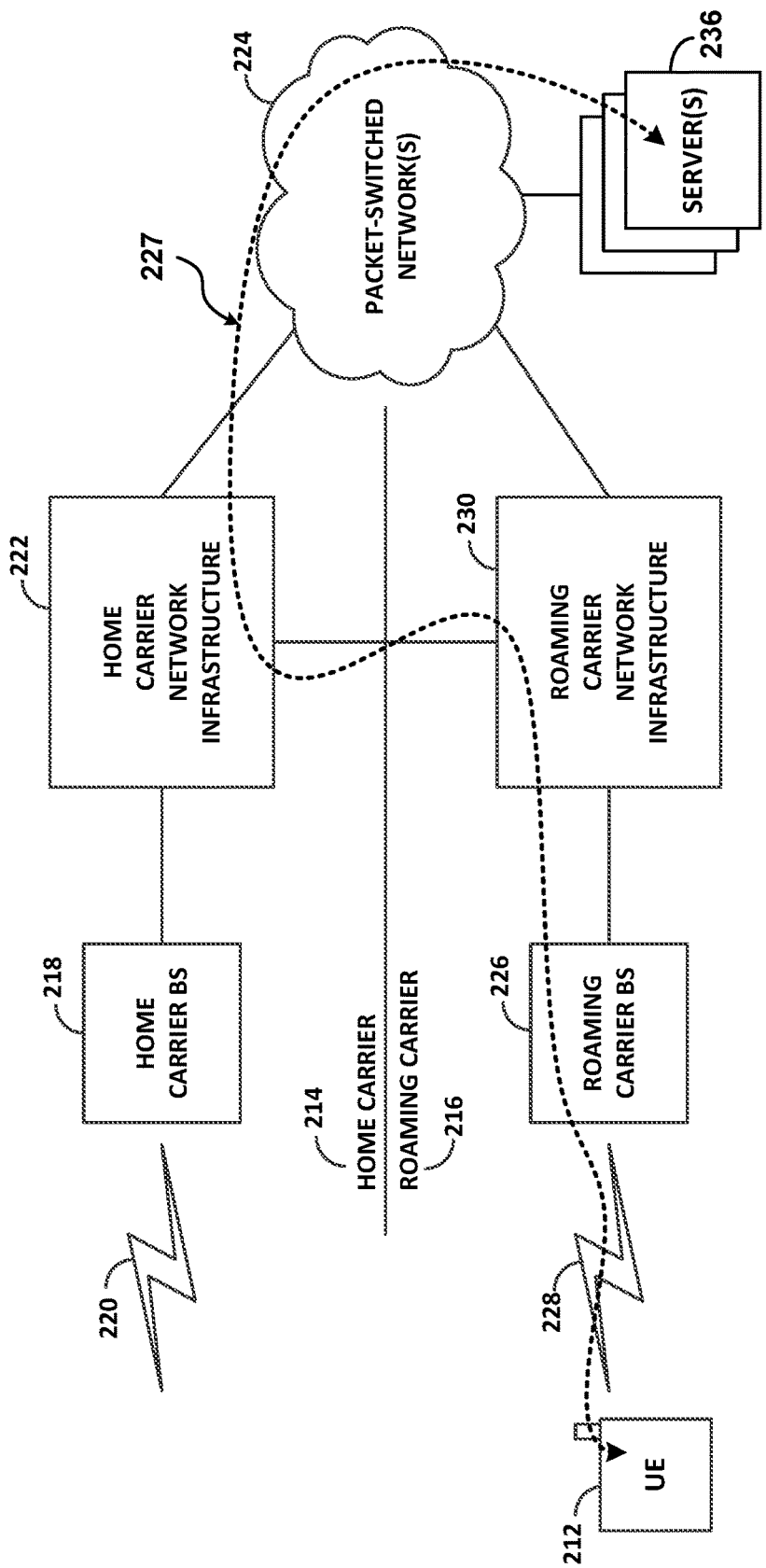
FIG. 2 is a simplified network diagram of a first example of wireless communications networks of two service providers, according to example embodiments of the disclosed systems and methods.

FIG. 2 is a simplified block diagram illustrating respective wireless communication networks of two service providers, or "carriers," interconnected in an arrangement that could support roaming between the networks of respective subscribers of the two networks, and in which example embodiments of the present method can be implemented. For purpose of the illustration, the two service providers are identified simply as home carrier 214 and roaming carrier 216. By way of example, a mobile device, such as UE 212, is taken to be a subscriber of the home carrier 214 that is roaming in the wireless network of the roaming carrier 216. The home carrier system 214 includes a representative home carrier base station 218, which radiates to provide a home carrier coverage area 220, and representative home carrier network infrastructure 222, which provides connectivity with one or more packet-switched networks 224. Further, the roaming carrier system 216 includes a representative roaming carrier base station 226, which radiates to provide a roaming carrier coverage area 228, and representative roaming carrier network infrastructure 230, and also provides connectivity with the packet-switched network(s) 224, which may in turn enable packet communications with one or more server(s) 236, for example. In practice, the respective carrier infrastructures could be connected to different packet-switched networks, or different intervening networks (not shown). In addition, as shown, the roaming carrier network infrastructure 230 is communicatively linked with the home carrier network infrastructure 222, to facilitate exchange of control and bearer data between the carriers' networks.

In this arrangement, it is assumed that the home carrier system 214 is provided by a home carrier, the roaming carrier system 216 is provided by a roaming carrier that has a roaming agreement with the home carrier, and the UE 212 subscribes to service of the home carrier. It is further assumed that the UE is currently not within any coverage of the home carrier system (including coverage 220 of home carrier base station 218) that is sufficiently strong to trigger attachment with the home carrier. By way of example the UE is assumed to be within sufficiently strong coverage of roaming carrier base station 226 to trigger attachment with that roaming carrier base station 226.

With such an arrangement, the UE may transmit an attach request over the air interface 228 to the roaming carrier base station 226, which may trigger signaling to the roaming carrier network infrastructure 230 and in turn to the home carrier network infrastructure 222. The home carrier network infrastructure 222 may then authenticate and authorize the UE for service. Further, the home carrier network infrastructure 222 may assign an IP address for use by the UE to communicate on the packet-switched network. In practice, the home carrier network infrastructure 222 may select this IP address from a default pool of IP addresses available for assignment to UEs and may direct use of the selected IP address by the UE.

Upon thus becoming attached via the roaming carrier base station 226 and being assigned an IP address by the home carrier network infrastructure 222, the UE 212 may then use the assigned IP address to engage in packet-data communication on the packet-switched network that extends via the roaming carrier base station 226, the roaming carrier network infrastructure 230, and the home carrier network infrastructure 222. The UE 212 may then engage in one or more communications sessions, including one with the server(s) 236 in the packet-switched network(s) 224. As shown, such communication sessions may traverse a communication path 227 that includes network entities in both home and roaming carrier systems.

In the arrangement of FIG. 2, for instance, when UE 212 seeks to attach via the roaming carrier base station 226 and associated signaling therefore passes to the home carrier network infrastructure 222, the home carrier network infrastructure 222 may authenticate and authorize the UE for service. Further, in that attachment process or perhaps in response to a related request for assignment of an IP address to the UE, the home carrier network infrastructure 222 will assign an IP address to the UE. In doing so, the home carrier network infrastructure 222 may determine that the UE is being served by a roaming carrier's cell site (e.g., is attached via the roaming carrier's cell site or is attempting to so attach). In accordance with example embodiments, the home carrier may then further use context information about the communication session to determine if the communication session will used for foreground or background communications.

Figure 3:
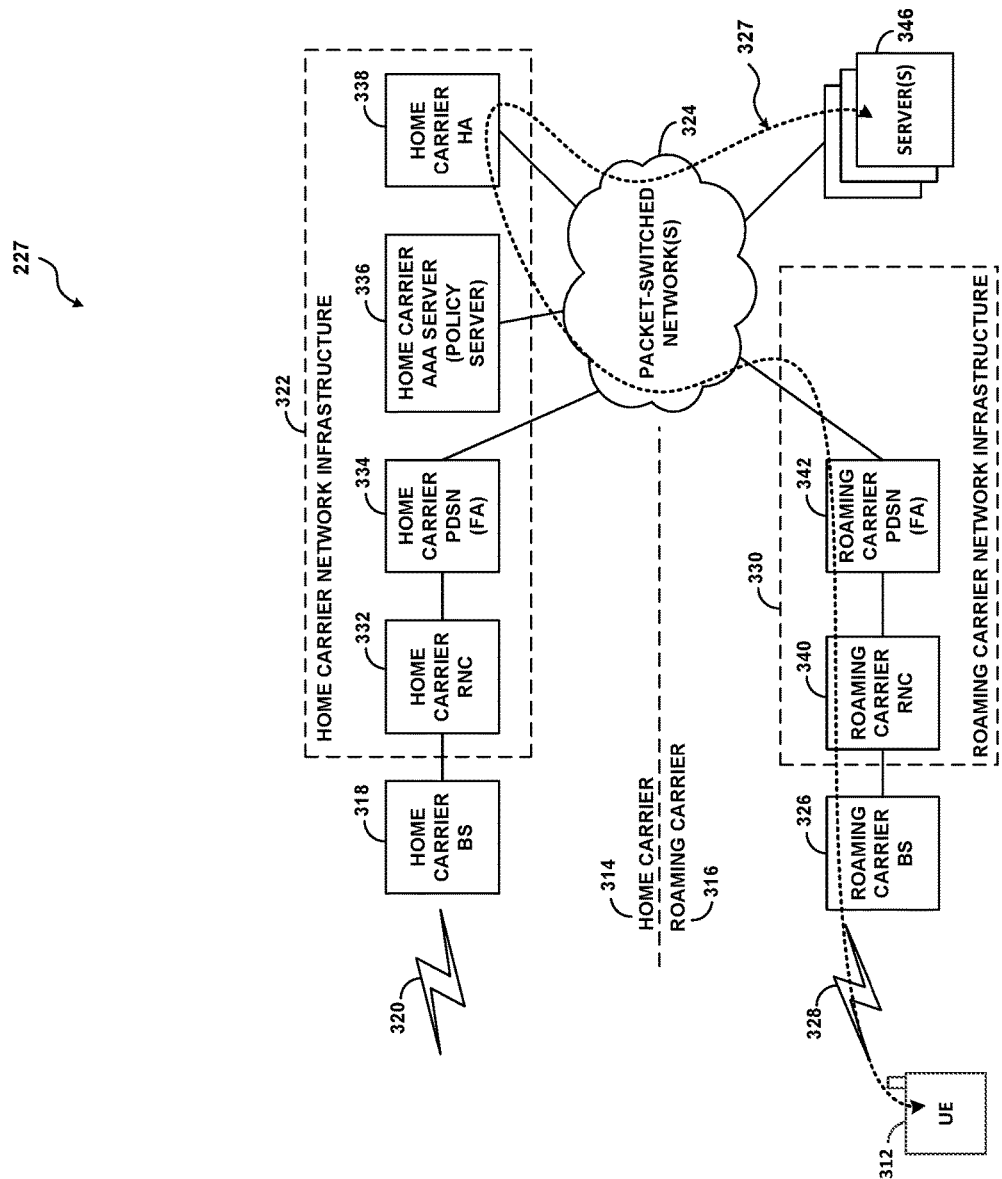
FIG. 3 is a simplified network diagram of a second example of wireless communications networks of two service providers, according to example embodiments of the disclosed systems and methods.

FIG. 3 next depicts an example "3G" network arrangement again illustrative of roaming support, in this example between home carrier 314 and roaming carrier 316, and in which example embodiments of the present method can be implemented. In this example arrangement, the home carrier base station 318 and roaming carrier base station 326 may be base transceiver stations (BTSs), access nodes (ANs), NodeBs, or the like, and the home carrier coverage area 320 and roaming carrier cover area 328 may each be compliant with an air interface protocol such as Code Division Multiple Access (CDMA) or Global System for Mobile Communication (GSM), for instance. The home carrier network infrastructure 322 then includes a radio network controller (RNC) 332 that controls aspects of home carrier base station operation, a packet data serving node (PDSN) 334 that provides connectivity with one or more packet-switched network(s) 324, an authentication, authorization, and accounting (AAA) server 336 that functions as a policy server, and a Mobile-IP home agent (HA) 338 that provides IP address assignment. Further, the roaming carrier network infrastructure 330 likewise includes an RNC 340 that controls aspects of roaming carrier base station operation, and a PDSN 342 that provides connectivity with the packet-switched network(s) 324, which in turn may enable packet communications with one or more server(s) 346, for example.

With this arrangement, when a UE 312 does not detect sufficient home carrier coverage but detects sufficient coverage of roaming carrier base station 326, the UE may transmit an access request or connection request over the air to the roaming carrier base station 326, which the roaming carrier base station 326 may forward to the roaming carrier RNC 340. The roaming carrier RNC 340 may then direct the roaming carrier base station 326 to establish a radio-link layer connection over the air interface with the UE, and the roaming carrier base station 326 may do so.

Provided with that radio-link layer connection, the UE may then engage in signaling with the roaming carrier PDSN 342 to establish a data-link layer connection. In particular, the UE may transmit via the roaming carrier base station 326 to the roaming carrier RNC 340 a request to establish a point-to-point protocol (PPP) session with the roaming carrier PDSN 342, and the roaming carrier RNC 340 would send an associated registration request to the roaming carrier PDSN 342. This PPP session request and associated registration request may carry an identifier of the UE, such as a network access identifier, which also indicates the UE's home carrier. Based on that identifier or other data, the roaming carrier PDSN 342 may therefore signal to the UE's home carrier AAA server 336 for authorization. Thus, the roaming carrier PDSN 342 may transmit a RADIUS request to the home carrier AAA server 336 seeking authorization to serve the UE. Upon successful authorization, signaling may then pass back to the roaming carrier PDSN 342 and ultimately to the UE to complete data-link layer establishment.

Having an established radio-link layer connection with the roaming carrier base station 326 and a data-link layer connection with the roaming carrier PDSN 342, the UE may then engage in signaling to establish a network-layer connection through which to engage in communication on the packet-switched network(s) 324. In particular, the UE may transmit to the roaming carrier PDSN 342 a Mobile-IP registration request destined to the home carrier HA 338, and the roaming carrier PDSN 342, acting as a Mobile-IP foreign agent (FA), may forward that request to the home carrier HA 338. The home carrier HA 338 may then select an IP address to assign to the UE, record a binding between that selected IP address and a care-of address (such as an IP address of the roaming carrier PDSN 342), and send a reply to the UE specifying the assigned IP address.

Provided with the assigned IP address, the UE may then use that IP address to engage in communication with one or more server(s) 346 in (or accessible via) the packet-switched network(s) 324. In particular, the UE may transmit packet-data from that IP address to a destination IP address, and that packet-data may flow via the roaming carrier base station 326, the roaming carrier RNC 340, and the roaming carrier PDSN 342 to the home carrier HA 338 and via the packet-switched network(s) 324 to its destination. Further, when another party transmits data to the UE's assigned IP address, that data may flow over the packet-switched network(s) 324 to the home carrier HA 338, and the home carrier HA 338 may forward that data to the roaming carrier PDSN 342 for transmission via the roaming carrier RNC 340 and roaming carrier base station 326 to the UE. The communication path 327 illustrates such a path between the UE 312 and server(s) 346.

In accordance with example embodiments, the home carrier AAA server 336 in this arrangement can function can thus determine that the UE 312 is roaming in the roaming carrier 316. As such, the home carrier AAA server 336 can either carry out the context-base determination describe above when it determines that the UE is roaming, or flag the UE so one or more other network entities involved in the path 327 may recognize the UE as roaming carry out the context-based determination.

Figure 4:
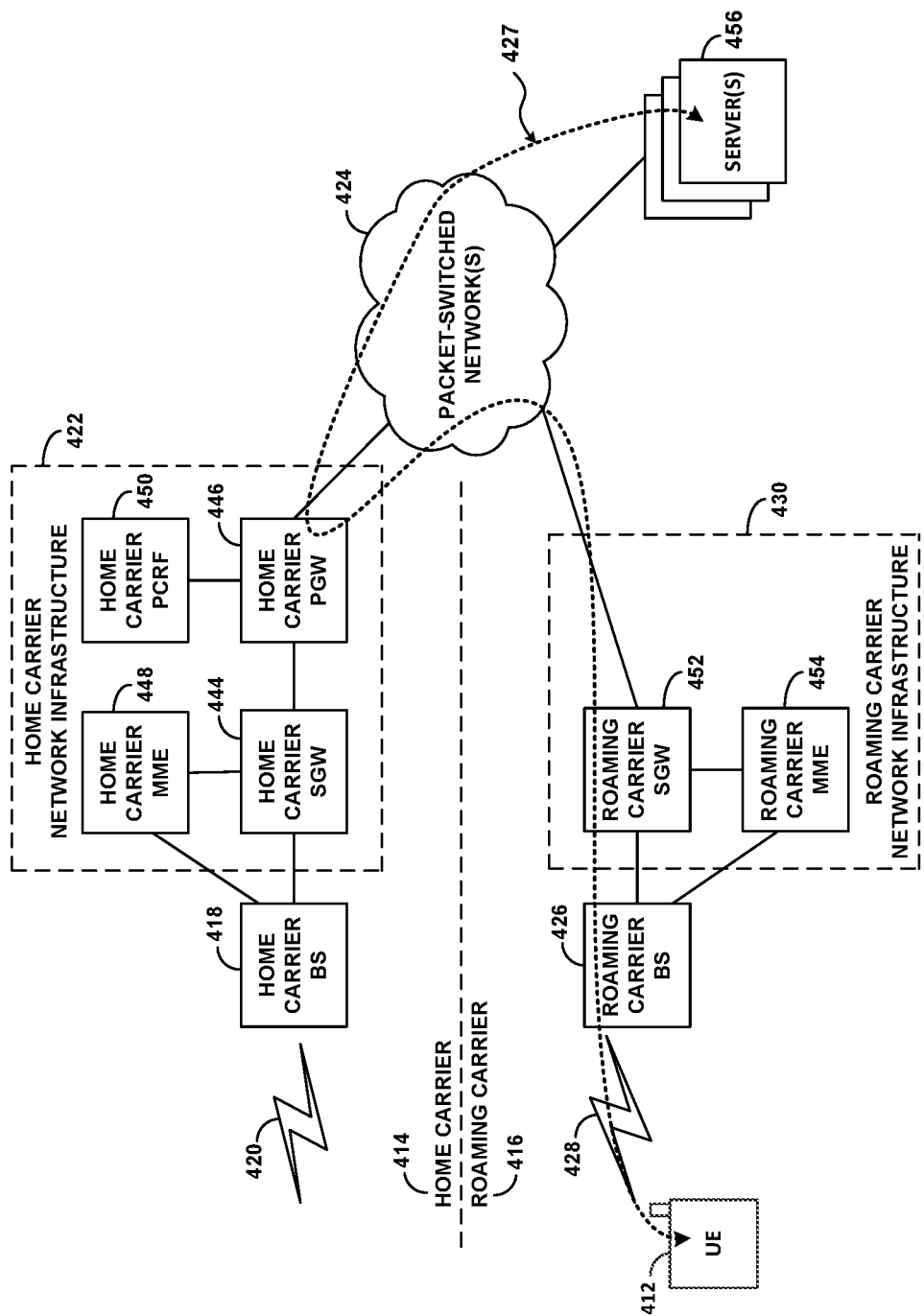
FIG. 4 is a simplified network diagram of a third example of wireless communications networks of two service providers, according to example embodiments of the disclosed systems and methods.

As one more example, FIG. 4 depicts an example "4G" network arrangement again illustrative of roaming support, in this example between home carrier 414 and roaming carrier 416, and in which example embodiments of the present method can be implemented. In this example arrangement, the home carrier base station 418 and roaming carrier base station 426 may be eNodeBs or the like, and the home carrier coverage area 420 and roaming carrier cover area 428 may each be compliant with an air interface protocol such as LTE (an Orthogonal Frequency Division Multiple Access (OFDMA) protocol). The home carrier network infrastructure 422 then includes a serving gateway (SGW) 444 interfaced with the home carrier base station (eNodeB) 418, a packet data network gateway (PGW) 446 interfaced with the SGW and providing connectivity with the packet-switched network(s) 424 for access to server(s) 456, a mobility management entity (MME) 448 interfaced with the SGW 444 and with the home carrier base station 418, and a policy and charging rules function (PCRF) 450 interfaced with the PGW 446 and functioning as a policy server. Further, the roaming carrier network infrastructure 430 likewise includes an SGW 452 and an MME 454.

With this arrangement, when UE 412 does not detect sufficient home carrier coverage but detects sufficient coverage of roaming carrier base station 426, the UE may transmit to the roaming carrier base station 426 an attach request, including an identifier of the UE (e.g., international mobile subscriber identity (IMSI)) and an identifier of the UE's home carrier (e.g., public land mobile network (PLMN) identifier (H-PLMN ID)), which the roaming carrier base station 426 may pass to the roaming carrier MME 454. The roaming carrier MME 454 may then responsively transmit to the roaming carrier SGW 452 a create_session request, including the UE-provided information as well as a global identifier of the roaming carrier cell site that incorporates both an identifier of the roaming carrier (e.g., visited PLMN ID (V-PLMN ID)) and a cell-site ID.

Based on the included information indicating that this is a roaming UE, the roaming carrier SGW 452 may then responsively transmit a corresponding create_session request to the UE's home carrier PGW 446, similarly including the UE provided information and the global cell identifier. In turn, the home carrier PGW 446 may then send to the home carrier PCRF 450 a DIAMETER message that similarly includes the UE provided information and the global cell identifier and that seeks authorization and an indication of any applicable policy rules. And the home carrier PCRF 50 may then respond to the home carrier PGW 46 with a directive for the home carrier PGW 446 to assign an IP address to the UE. Thus, the home carrier PCRF 450 may select an IP address to assign to the UE, record a binding between that IP address and the UE, and send to the roaming carrier SGW 452 a create_session response specifying the assigned IP address. The roaming carrier SGW 452 may then signal in turn to the roaming carrier MME 454, which may signal in turn to the roaming carrier base station 26, which may signal in turn to the UE, providing the UE with the assigned IP address.

Provided with this assigned IP address, the UE may then use the IP address to engage in communication with server(s) 456 via the packet-switched network(s) 424. In particular, the UE may transmit packet-data from that IP address to a destination IP address, and that packet-data may flow via the roaming carrier base station 426 and the roaming carrier SGW 452 to the home carrier PGW 446 and via the packet-switched network(s) 424 to one or more of the server(s) 456. Further, when another party transmits data to the UE's assigned IP address, that data may flow over the packet-switched network(s) 424 to the home carrier PGW 446, and the home carrier PGW 446 may forward that data to the roaming carrier SGW 452 for transmission via the roaming carrier base station 426 to the UE. The communication path 427 illustrates such a path between the UE 412 and server(s) 456.

In accordance with example embodiments, in this arrangement, the home carrier PCRF 450 can determine when the UE 412 is roaming and cause the home carrier PGW 446 to carry out the context-based determination described above.

In all three examples of roaming above, an entity in the home network of the UE can determine when the UE is roaming, and then take action to determine if and when communications to or requested by the UE are foreground or background based on context information. As seen in these examples, the determination of roaming can be made by an entity involved in authorizing the establishment of a new communication session with the UE. In this case, the entity might be considered to be in the signaling path of the communication. Additionally or alternatively, the entity could be in the bearer path of the communication, such as the home carrier PGW 446 in FIG. 4. In this case, the PGW 446 could recognize that it is terminating a tunnel with an entity in the network of the roaming carrier 416, and thereby deduce that the UE is roaming. Once it is recognize that the UE is roaming the home network entity may then monitor communications with the UE to determine which ones may be foreground and which background. Limiting those that are background can then help reduce resources allocated by the roaming carrier for communications that can otherwise be limited or delayed for example.

Figure 5:
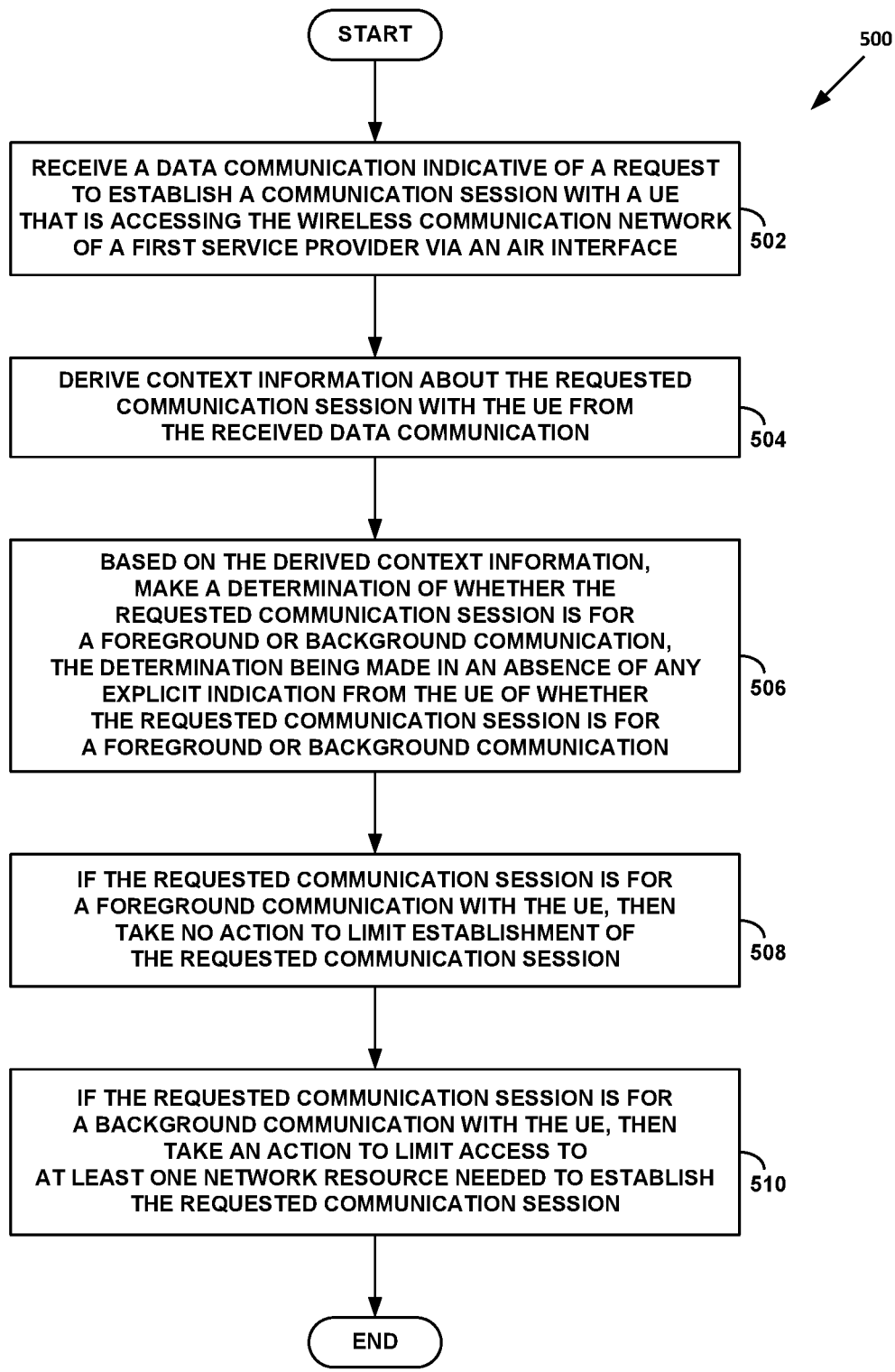
FIG. 5 is a flowchart illustrating one example method for distinguishing between foreground and background communications based on analysis of context information, in accordance with example embodiments.
Figure 6:
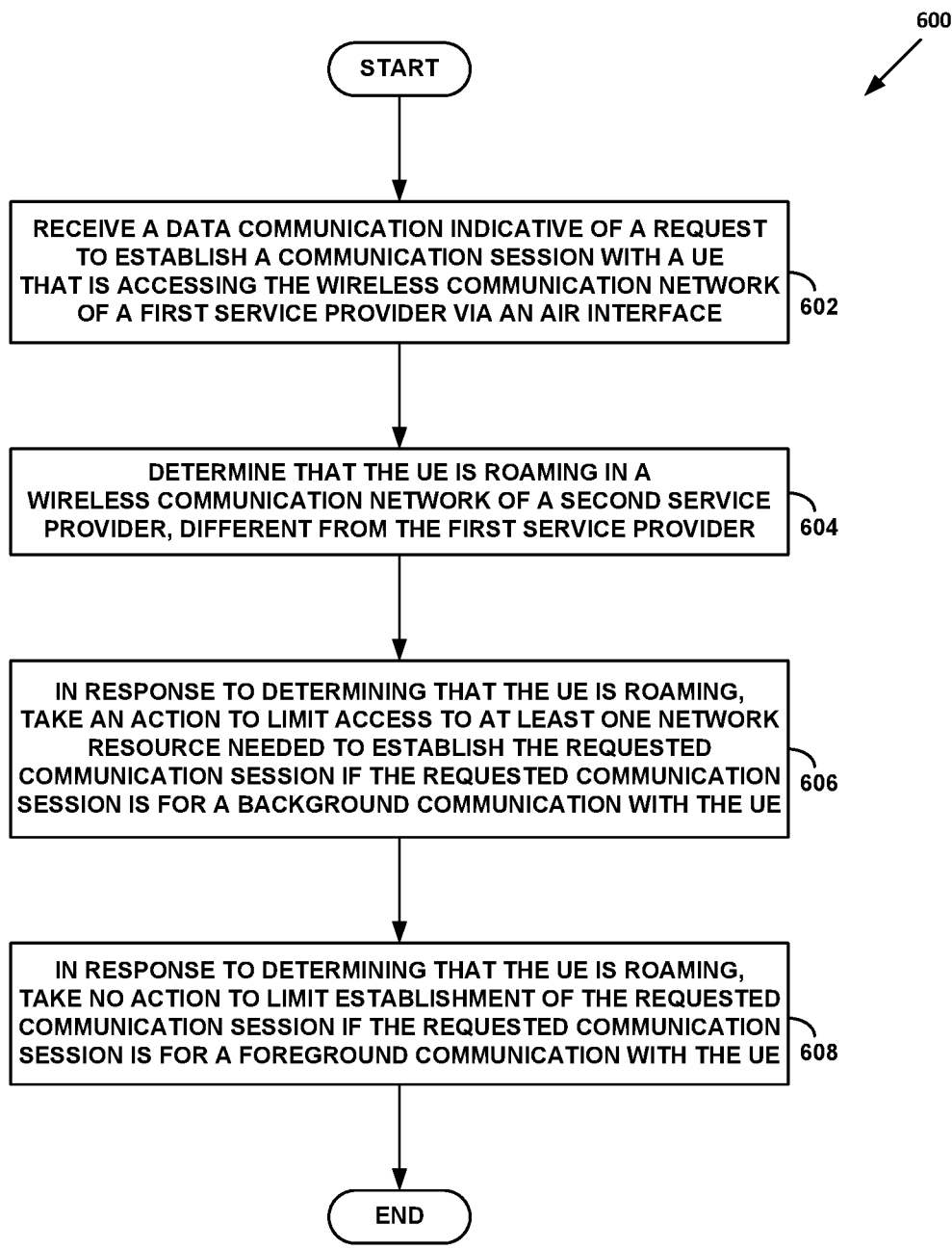
FIG. 6 is a flowchart illustrating another example method for distinguishing between foreground and background communications based on analysis of context information, in accordance with example embodiments.

Turning now to example methods, FIGS. 5 and 6 are flowchart illustrating methods 500 and 600, according to example embodiments. Example methods, such as methods 500 and 600, may be carried out in whole or in part a wireless communication network by one or more network entities or components, such as the eNodeB 112, SGW 120, PWG 122, MME 118, or HSS 128 of the representative LTE RAN 100 shown in FIG. 1. Other examples of a network entity could be similar or corresponding components to those in FIG. 1 shown in FIGS. 2, 3, and 4, for example. It should be understood that example methods, such as methods 500 and 600, may be carried out by other entities or combinations of entities as well as in other arrangements, without departing from the scope of the invention. By way of example, the methods 500 and 600 can be implemented as machine language instructions that can be stored on non-transient machine-readable media (e.g, solid state memory, magnetic disk, etc), and that when executed by one or more processors of a base station to cause the base station to carry out operations, steps, and/or functions of the method. Example method 500 is described first.

In example embodiments, method 500 may operable in an entity of a wireless communication network.

As shown by block 502 in FIG. 5, method 500 involves the network entity receiving a data communication indicative of a request to establish a communication session with a user equipment device (UE) that is accessing the wireless communication network via an air interface.

As shown by block 504 in FIG. 5, method 500 next involves the network entity deriving context information about the requested communication session with the UE from the received data communication.

As shown by block 506 in FIG. 5, method 500 next involves the network entity making a determination, based on the derived context information about the requested communication session, of whether the requested communication session is for a foreground communication or a background communication with the UE. That is, the determination is made in an absence of any explicit indication from the UE of whether the requested communication session is for a foreground or background communication.

As shown by block 508 in FIG. 5, method 500 next involves the network entity taking no action to limit establishment of the requested communication session, if the determination is that the requested communication session is for a foreground communication with the UE.

Finally, as shown by block 510, method 500 involves the network entity taking an action to limit access to at least one network resource needed to establish the requested communication session, if the determination is that the requested communication session is for a background communication with the UE.

In accordance with example embodiments, receiving the data communication indicative of the request to establish the communication session with the UE can entail receiving one of two types of messages. Namely, a request message from the UE to setup the requested communication session, or a message from a different network entity requesting allocation of, and/or authorization for, a network resource for the requested communications session.

In accordance with example embodiments, deriving the context information about the requested communication session with the UE from the received data communication can entail determining a characteristic of the requested communication session. In particular, the characteristic could be at least one of: an identification of the requested communication session as a known type of foreground communication; a temporal proximity of the received request to a previous request for a known type of foreground communication; a temporal proximity of the received request to a threshold number requests from the UE within a specified minimum time interval; a location of the UE; a speed of motion of the UE; a quantity of data designated for transfer during requested communication session; or an identification of a data type designated for transfer during the request communication session as media data. The above characteristics can be associated with foreground communications—either known types or indicative of usage or user behavior typical or expected for foreground communications.

Thus, in further accordance with example embodiments, the making the determination based on the derived context information about the requested communication session could entail comparing the determined characteristic to a known characteristic of a foreground communication and then, based on the comparison, determining a likelihood that the requested communication session is for a foreground communication. For example, if the determined characteristic is an explicit identification of the requested communication session with a known type of foreground communication, the likelihood is certain. On the other hand, if the determined characteristic is a temporal proximity—for example 30 seconds—from a previous foreground communication, then the likelihood could less than certain. In this case, a likelihood of, for example 65% or greater, could be considered a determination that the requested communication session is also a foreground communication. Otherwise, the requested communication session would be deemed a background communication. Similarly, a high frequency of user requests for communications could be indicative of a real-time application, such as a game, and thus be taken as an indication of foreground communications. Temporal proximity of a new request to such high frequency of requests could be analyzed for a likelihood of the new request also being for a foreground communication. Again, a likelihood above some threshold could be considered, where the request communication is deemed a background communication if the likelihood is below the threshold, and vice versa. Similar analyses could be applied to the other characteristics.

In accordance with example embodiments, taking the action to limit access to at least one network resource needed to establish the requested communication session could entail denying at least one of: (i) an authorization for establishment of the requested communication session, (ii) allocation of more than a threshold amount the at least one network resource, or (iii) permission for more than a threshold quantity of data transmission in the requested communication session. For example, if the network entity is an authorization server or policy server, or the like, it could withhold or deny authorization required to allow the communication to proceed. If the network entity is a base station, it could withhold or a deny allocation of an air interface, such as a wireless communication channel, for example. If the network entity is a packet gateway or the like, it could deny assignment of a network address (e.g., an IP address). These are just some examples.

In accordance with example embodiments, the method 600 could further entail determining that the UE is roaming in a wireless communication network of a second service provider, different from the first service provider. In this case, deriving the context information about the requested communication session with the UE from the received data communication could be carried out in response to determining that the UE is roaming in the wireless communication network of the second service provider. That is, initiating the actions involved in differentiating between foreground and background communications could be contingent upon first determining that the communication session is being requested by a UE that is roaming in the wireless communication network of the second service provider.

In further accordance with example embodiments, a determination that the UE is roaming could entail a request message from the UE via a second network entity known to be part of the wireless communication network of the second service provider. For example, the data communication indicative of the request to establish the communication session with could be a setup request from the UE received from a known signaling node or packet gateway (e.g., a PDSN or SGW) in the wireless communication network of the second service provider.

In another example, determining that the UE is roaming in the wireless communication network of the second service provider comprises receiving a request for service authorization on behalf of the UE from a second network entity known to be part of the wireless communication network of the second service provider. In this case, the data communication indicative of the request to establish the communication session could be a query from a server in the wireless communication network of the second service provider seeking authorization to provide a service request by the UE in the second service provider's network.

In further accordance with example embodiments, the respective wireless communication networks of the first and second service providers are each configured for operating according to at least one of LTE or CDMA. Examples of network interconnectivity that supports roaming are shown in FIGS. 2, 3, and 4.

Example method 600, shown in FIG. 6, is next described. In example embodiments, method 600 may operable in an entity of a wireless communication network.

As shown by block 602 in FIG. 6, method 600 involves receiving at the network entity a data communication indicative of a request to establish a communication session with a user equipment device (UE) that is accessing the wireless communication network via an air interface.

As shown by block 604 in FIG. 6, method 600 next involves, determining that the UE is roaming in a wireless communication network of a second service provider, different from the first service provider, when the data communication is received.

As shown by block 606 in FIG. 6, method 600 next involves, in response to determining that the UE is roaming, taking an action to limit access to at least one network resource needed to establish the requested communication session if the requested communication session is for a background communication with the UE.

Finally, as shown by block 608, method 600 involves in response to determining that the UE is roaming, taking no action to limit establishment of the requested communication session if the requested communication session is for a foreground communication with the UE.

In accordance with example embodiments, determining that the UE is roaming in the wireless communication network of the second service provider could entail receiving the data communication via a particular communication path. More specifically, the network entity could communicatively situated in a particular communication path configured for carrying at least one of (i) signaling messages between the network entity and a second entity known to be part of the wireless communication network of the second service provider, or (ii) bearer-channel data between the network entity and the UE via a second network entity known to be part of the wireless communication network of the second service provider. Then, receiving the data communication via a particular communication path could be taken as evidence that the UE is roaming.

In further accordance with example embodiments, determining that the UE is roaming in the wireless communication network of the second service provider could entail receiving the request message from the UE via a second network entity known to be part of the wireless communication network of the second service provider. For example, the data communication indicative of the request to establish the communication session could be a request message from the UE to setup the requested communication session from the entity in the wireless communication network of the second service provider.

Also in accordance with example embodiments, determining that the UE is roaming in the wireless communication network of the second service provider could entail receiving a request for service authorization on behalf of the UE from a second network entity known to be part of the wireless communication network of the second service provider.

As with the method 500, taking the action to limit access to at least one network resource needed to establish the requested communication session if the requested communication session is for a background communication with the UE could entail making a determination that the requested communication session is for a background communication with the UE based on context information about the requested communication session with the UE derived from the received data communication. In particular, the determination could made in an absence of any explicit indication from the UE of whether the requested communication session is for a foreground or background communication. Then, in response to making the determination, the network entity could deny at least one of: (i) an authorization for establishment of the requested communication session, (ii) allocation of more than a threshold amount the at least one network resource, or (iii) permission for more than a threshold quantity of data transmission in the requested communication session.

It will be appreciated that the example methods 500 and 600 could each include alternate and/or additional steps, while still remaining within the scope and spirit of example embodiments herein.

Figure 7:
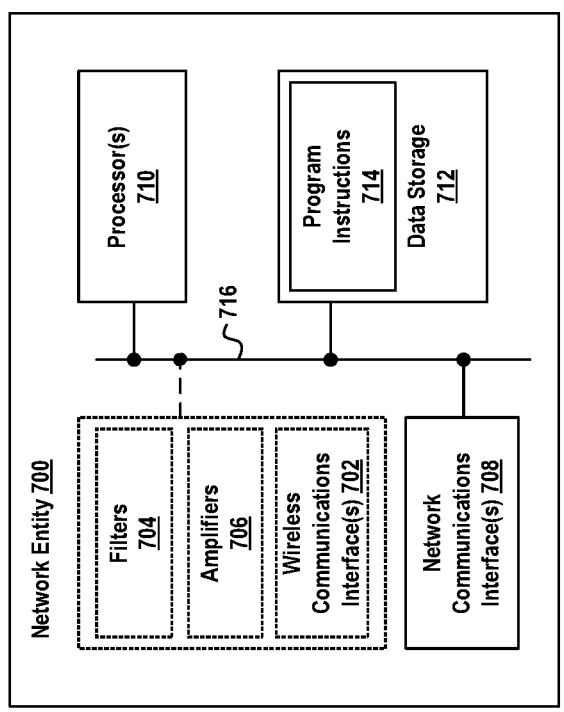
FIG. 7 is a simplified block diagram of an example network entity, in accordance with example embodiments.

FIG. 7 is a simplified block diagram of an example network 700 according to some embodiments of the disclosed systems and methods, including, for example, one of the entities of the LTE network 110 shown FIG. 1. It will be appreciated that there can be numerous specific implementations of a network entity, such as the network entity 700, in which the disclosed frequency allocation methods could be implemented. As such, network entity 700 is representative of a means for carrying out frequency allocation, in accordance with the methods and steps described herein by way of example.

In an example embodiment, the network entity 700 could be a base station (e.g., an eNodeB). In this case, the base station could include one or more wireless communications interfaces 702, one or more filters 704, and one or more amplifiers 706. These elements are depicted with dotted lines to indicate that they may not necessarily be present in other types of network entities, such as PGWs, SGWs, MMEs or HSSs, for example. The network entity 700 may then further include one or more network communications interfaces 708, one or more processors 710, and data storage 712, all of which may be coupled together by a system bus 716 or similar mechanism. In addition, the base station 700 may also include external storage, such as magnetic or optical disk storage (not shown). Variations from this arrangement are possible as well, including addition and/or omission of components, combination of components, and distribution of components in any of a variety of ways.

The network entity components may be arranged to support wireless communications in a wireless communication network that is compliant with one or more of the variety of wireless air-interface protocols noted above, in addition to other protocols now known or later developed. In particular, the components of the network entity 700 are configured to support context-based determination of whether a communication is a foreground or background communication, in accordance with the example embodiments described herein. The components of the network entity 700 are further configured to support determining when a UE is roaming, also in accordance with the example embodiments described herein.

The one or more network interfaces 208 include physical network interfaces (e.g., optical, electrical) that enable the base station 200 to send and receive traffic directly or indirectly to/from other networks, such as the Public Switched Telephone Network (PSTN), the Internet, or other networks. The one or more network interfaces 208 may take the form of Ethernet network interface cards/ports, optical network interface cards/ports or other physical interfaces to one or more transmission networks that directly or indirectly connect the base station 200 to its neighboring base stations as well as to the PSTN, the Internet, and/or other networks.

The one or more processors 710 comprise one or more general-purpose processors (e.g., microprocessors) and/or one or more special-purpose processors (e.g., dedicated digital signal processors (DSPs), application specific integrated circuits (ASICs), etc.). The non-transitory data storage 712 comprises one or more volatile and/or non-volatile storage components, such as magnetic or optical memory or disk storage. Non-transitory data storage 712 can be integrated in whole or in part with the one or more processors 710, as cache memory or registers for instance. As further shown, non-transitory data storage 712 is equipped to hold program instructions 714. In some embodiments, one or more of the processors 710 and non-transitory data storage 712 may be integrated in whole or in part with one or more of the wireless communications interfaces 702 and/or network communications interfaces 708.

The program instructions 714 comprise machine language instructions that define routines and software program code executable by the one or more processors 710 (alone or in combination with the wireless communications interface(s) 702 and network communications interface(s) 708) to carry out various functions described herein.

While various aspects have been disclosed herein, other aspects will be apparent to those of skill in the art. The various aspects disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting. For example, while the disclosed embodiments focus on LTE-based implementations, the disclosed systems and methods are equally applicable to any other protocol or network implementation that is configurable to allocate frequencies to traffic demands as described herein.

We claim:

1. In a network entity of a wireless communication network of a first service provider, a method comprising:
   at the network entity, receiving a data communication indicative of a request to establish a communication session with a user equipment device (UE) that is accessing the wireless communication network via an air interface;
   at the network entity, deriving context information about the requested communication session with the UE from the received data communication;
   based on the derived context information about the requested communication session, making a determination at the network entity of whether the requested communication session is for a foreground communication or a background communication with the UE, the determination being made in an absence of any explicit indication from the UE of whether the requested communication session is for a foreground or background communication: and
   if the determination is that the requested communication session is for a background communication with the UE, then taking an action to limit access to at least one network resource needed to establish the requested communication session,
   wherein making the determination based on the derived context information about the requested communication session comprises:
   determining a characteristic of the requested communication session;
   comparing the determined characteristic to a known characteristic of a foreground communication; and
   based on the comparison, determining a likelihood that the requested communication session is for a foreground communication.

2. The method of claim 1, wherein receiving the data communication indicative of the request to establish the communication session with the UE comprises receiving one of: a request message from the UE to setup the requested communication session, or a message from a different network entity requesting allocation of, and/or authorization for, a network resource for the requested communications session.

3. The method of claim 1, wherein the characteristic is at least one of: an identification of the requested communication session as a known type of foreground communication; a temporal proximity of the received request to a previous request for a known type of foreground communication; a temporal proximity of the received request to a threshold number requests from the UE within a specified minimum time interval; a location of the UE; a speed of motion of the UE; a quantity of data designated for transfer during requested communication session; or an identification of a data type designated for transfer during the request communication session as media data.

4. The method of claim 1, wherein taking the action to limit access to at least one network resource needed to establish the requested communication session comprises denying at least one of: (i) an authorization for establishment of the requested communication session, (ii) allocation of more than a threshold amount the at least one network resource, or (iii) permission for more than a threshold quantity of data transmission in the requested communication session.

5. The method of claim 1, further comprising determining that the UE is roaming in a wireless communication network of a second service provider, different from the first service provider,
   and wherein deriving the context information about the requested communication session with the UE from the received data communication comprises deriving the context information in response to determining that the UE is roaming in the wireless communication network of the second service provider.

6. The method of claim 5, wherein the data communication indicative of the request to establish the communication session with the UE is a request message from the UE to setup the requested communication session,
   and wherein determining that the UE is roaming in the wireless communication network of the second service provider comprises receiving the request message from the UE via a second network entity known to be part of the wireless communication network of the second service provider.

7. The method of claim 5, wherein determining that the UE is roaming in the wireless communication network of the second service provider comprises receiving a request for service authorization on behalf of the UE from a second network entity known to be part of the wireless communication network of the second service provider.

8. The method of claim 5, wherein the respective wireless communication networks of the first and second service providers are each configured for operating according to at least one of LTE or CDMA.

9. In a network entity of a wireless communication network of a first service provider, a method comprising:
   at the network entity, receiving a data communication indicative of a request to establish a communication session with a user equipment device (UE) that is accessing the wireless communication network via an air interface;
   determining that the UE is roaming in a wireless communication network of a second service provider, different from the first service provider, when the data communication is received;
   in response to determining that the UE is roaming, determining a characteristic of the requested communication session;
   upon determining the characteristic, comparing the determined characteristic to a known characteristic of a foreground communication;
   based on the comparison, determining whether the requested communication session is for a foreground communication or a background communication with the UE; and
   taking an action to limit access to at least one network resource needed to establish the requested communication session if the requested communication session is for a background communication with the UE.

10. The method of claim 9, wherein the network entity is communicatively situated in a communication path configured for carrying at least one of (i) signaling messages between the network entity and a second entity known to be part of the wireless communication network of the second service provider, or (ii) bearer-channel data between the network entity and the UE via a second network entity known to be part of the wireless communication network of the second service provider,
   and wherein determining that the UE is roaming in the wireless communication network of the second service provider comprises receiving the data communication indicative of the request to establish a communication session with the UE via the communication path.

11. The method of claim 9, wherein the data communication indicative of the request to establish the communication session with the UE is a request message from the UE to setup the requested communication session,
   and wherein determining that the UE is roaming in the wireless communication network of the second service provider comprises receiving the request message from the UE via a second network entity known to be part of the wireless communication network of the second service provider.

12. The method of claim 9, wherein determining that the UE is roaming in the wireless communication network of the second service provider comprises receiving a request for service authorization on behalf of the UE from a second network entity known to be part of the wireless communication network of the second service provider.

13. The method of claim 9, wherein taking the action to limit access to at least one network resource needed to establish the requested communication session if the requested communication session is for a background communication with the UE comprises
   denying at least one of: (i) an authorization for establishment of the requested communication session, (ii) allocation of more than a threshold amount the at least one network resource, or (iii) permission for more than a threshold quantity of data transmission in the requested communication session.

14. A network entity in a wireless communication network of a first service provider, the network entity comprising:
   one or more processors; and
   and memory storing instructions that, when executed by the one or more processors, cause the network entity to carry out operations including:
   receiving a data communication indicative of a request to establish a communication session with a user equipment device (UE) that is accessing the wireless communication network via an air interface;
   determining that the UE is roaming in a wireless communication network of a second service provider, different from the first service provider, when the data communication is received;
   in response to determining that the UE is roaming, determining a characteristic of the requested communication session;
   upon determining the characteristic, comparing the determined characteristic to a known characteristic of a foreground communication;
   based on the comparison, determining whether the requested communication session is for a foreground communication or a background communication with the UE; and
   taking an action to limit access to at least one network resource needed to establish the requested communication session if the requested communication session is for a background communication with the UE.

15. The network entity of claim 14, wherein the network entity is communicatively situated in a communication path configured for carrying at least one of (i) signaling messages between the network entity and a second entity known to be part of the wireless communication network of the second service provider, or (ii) bearer-channel data between the network entity and the UE via a second network entity known to be part of the wireless communication network of the second service provider,
   and wherein determining that the UE is roaming in the wireless communication network of the second service provider comprises receiving the data communication indicative of the request to establish a communication session with the UE via the communication path.

16. The network entity of claim 14, wherein the data communication indicative of the request to establish the communication session with the UE is a request message from the UE to setup the requested communication session,
   and wherein determining that the UE is roaming in the wireless communication network of the second service provider comprises receiving the request message from the UE via a second network entity known to be part of the wireless communication network of the second service provider.

17. The network entity of claim 14, wherein determining that the UE is roaming in the wireless communication network of the second service provider comprises receiving a request for service authorization on behalf of the UE from a second network entity known to be part of the wireless communication network of the second service provider.

18. The network entity of claim 14, wherein taking the action to limit access to at least one network resource needed to establish the requested communication session if the requested communication session is for a background communication with the UE comprises denying at least one of: (i) an authorization for establishment of the requested communication session, (ii) allocation of more than a threshold amount the at least one network resource, or (iii) permission for more than a threshold quantity of data transmission in the requested communication session.

19. The network entity of claim 15, wherein the respective wireless communication networks of the first and second service providers are each configured for operating according to at least one of LTE or CDMA, and wherein the network entity is one of: a home signaling gateway, an authorization server, a home subscriber server, a home agent, or home packet data serving node, and wherein the second network entity is one of: a base station, a visitor signaling gateway, a visitor authorization server, a visitor location register, foreign agent, or visitor packet data serving node.

* * * * *